(12) United States Patent
Nakai et al.

(10) Patent No.: US 7,575,124 B2
(45) Date of Patent: Aug. 18, 2009

(54) FUEL CAP WITH IMPROVED SEALABILITY

(75) Inventors: Toshiaki Nakai, Wako (JP); Syouichi Hokazono, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 644 days.

(21) Appl. No.: 11/166,494

(22) Filed: Jun. 24, 2005

(65) Prior Publication Data
US 2006/0006179 A1     Jan. 12, 2006

(30) Foreign Application Priority Data
Jul. 7, 2004    (JP)   ............................ 2004-200462

(51) Int. Cl.
 *B65D 53/00*      (2006.01)
 *B65D 41/04*      (2006.01)
 *B65D 55/16*      (2006.01)

(52) U.S. Cl. ............... 220/304; 220/288; 220/DIG. 33; 220/375

(58) Field of Classification Search ................. 220/304, 220/288, DIG. 33, 375
See application file for complete search history.

(56) References Cited

U.S. PATENT DOCUMENTS

| | | | | |
|---|---|---|---|---|
| 3,937,357 | A | * | 2/1976 | Burgess .................. 220/203.26 |
| 4,065,026 | A | * | 12/1977 | Williams et al. ............. 220/304 |
| 4,228,915 | A | * | 10/1980 | Hooper et al. ............... 220/288 |
| 6,206,219 | B1 | | 3/2001 | Bruggenolte |
| 6,568,553 | B2 | * | 5/2003 | Hagano et al. ............... 220/304 |

FOREIGN PATENT DOCUMENTS

JP          3389850          1/1993

* cited by examiner

*Primary Examiner*—Robin A. Hylton
(74) *Attorney, Agent, or Firm*—Hamre, Schumann, Mueller & Larson, P.C.

(57) ABSTRACT

A fuel cap includes a cap member, a screw member having a cylindrical body, a thread and a rib, and a gasket. The rib has at least one recess in the vicinity of the end part of the thread on the screw member in such manner that the space is provided that allows the screw member to be screwed tightly without causing interference between the rib and the filler neck thread.

8 Claims, 6 Drawing Sheets

FUEL CAP WITH IMPROVED SEALABILITY

BACKGROUND OF THE INVENTION

1. Field of the Invention

The present invention relates to a fuel cap for a filler opening of a fuel tank mounted on a vehicle, such as automobile.

2. Description of the Related Art

In general, vehicles are equipped with a fuel tank for storing fuel. Fuel caps are known for covering a filler opening of the filler neck of the fuel tank.

FIG. 6A shows a perspective view of a cap member included in a conventional fuel cap, and FIG. 6B shows a front view of the conventional fuel cap. As shown in FIG. 6B, the fuel cap C1 includes the cap member 100 (see FIG. 6A) and a screw member 200, and a thread 200a is provided on the outer periphery of the screw member 200. The thread 200a is capable of engaging with a filler neck thread F2 on an inner wall of a filler opening F1 of a filler neck F connected to a fuel tank (not shown). To the upper portion of the screw member 200, a gasket G for sealing is attached in such manner that it is covered with the cap member 100.

The fuel cap C1 having such a construction can be fitted on the filler opening F1 through the engagement of the thread 200a of the screw member 200 with the filler neck thread F2 on an inner wall of the filler opening F1. When the fuel cap C1 is fitted on the filler opening F1, the gasket G is brought into close contact with a sealing surface F1' of the filler opening F1, thereby sealing the filler opening F1 (for example, see Japanese patent publication No. 3389850, paragraphs 0011-0012 and FIG. 1). The obtained sealing of the filler opening F1 avoids evaporation of the fuel from the filler opening F1.

In addition, a fuel cap equipped with a device for monitoring the closing position of the cap member has been disclosed for the purpose of securing the closure of the fuel cap (for example, see U.S. Pat. No. 6,206,219B1, column 2, line 46—column 3, line 52 and FIG. 1).

In general, when the above-mentioned conventional fuel cap C1 is fitted on the filler opening F1, the fuel cap C1 is screwed in until the sealing with the gasket G is secured in order to prevent the fuel from evaporating from the filler opening F1.

Except for refueling event or the like, the fuel cap C1 is usually kept fully screwed in the filler opening F1, and thus the gasket G is subjected to vertical compression for a long period of time. This may result in deformative weakening of the gasket G, as shown in FIG. 7, which in turn may cause the loss of sealability at the filler opening F1. To compensate this loss, the fuel cap C1 should be further screwed in.

However in the conventional fuel cap C1, a terminal part 210 of the thread 200a is formed so that it is connected with a rib 220 which prevents the gasket G from being detached. For this reason, when an attempt is made to further screw the fuel cap C1, an end part F2' (shown with a broken line in FIG. 7) of the filler neck thread F2 hits the connected part, and the fuel cap C1 is hindered from being further screwed, resulting in poor seal-ability.

Therefore, it would be desirable to provide an improved fuel cap that can attain effective sealability regardless of the state of the gasket.

SUMMARY OF THE INVENTION

In one aspect of the present invention, a fuel cap is provided that can be tightly screwed well and obtain sealability at the filler opening of the filler neck, even after the gasket suffered deformative weakening.

In further aspect of the present invention, a fuel cap for a filler opening of a filler neck of a fuel tank is provided which includes: a cap member; a screw member including a cylindrical body, a thread provided on the outer periphery of the cylindrical body for engaging with a thread provided on the filler neck and a rib provided on the outer periphery of the cylindrical body which is closer to the cap member than the thread; and a gasket to be compressed against the filler opening for sealing the filler opening which gasket is attached to the screw member in such manner that the rib prevents the gasket from being detached, wherein the rib has at least one recess in the vicinity of the end part of the thread on the screw member in such manner that the filler neck thread can engage with the thread on the screw member without causing interference with the rib when the fuel cap is tightly screwed in the filler opening.

BRIEF DESCRIPTION OF THE DRAWINGS

The various aspects, other advantages and further features of the present invention will become more apparent by describing in detail illustrative, non-limiting embodiments thereof with reference to the accompanying drawings.

DETAILED DESCRIPTION OF THE EXEMPLARY EMBODIMENTS

Figure 1:
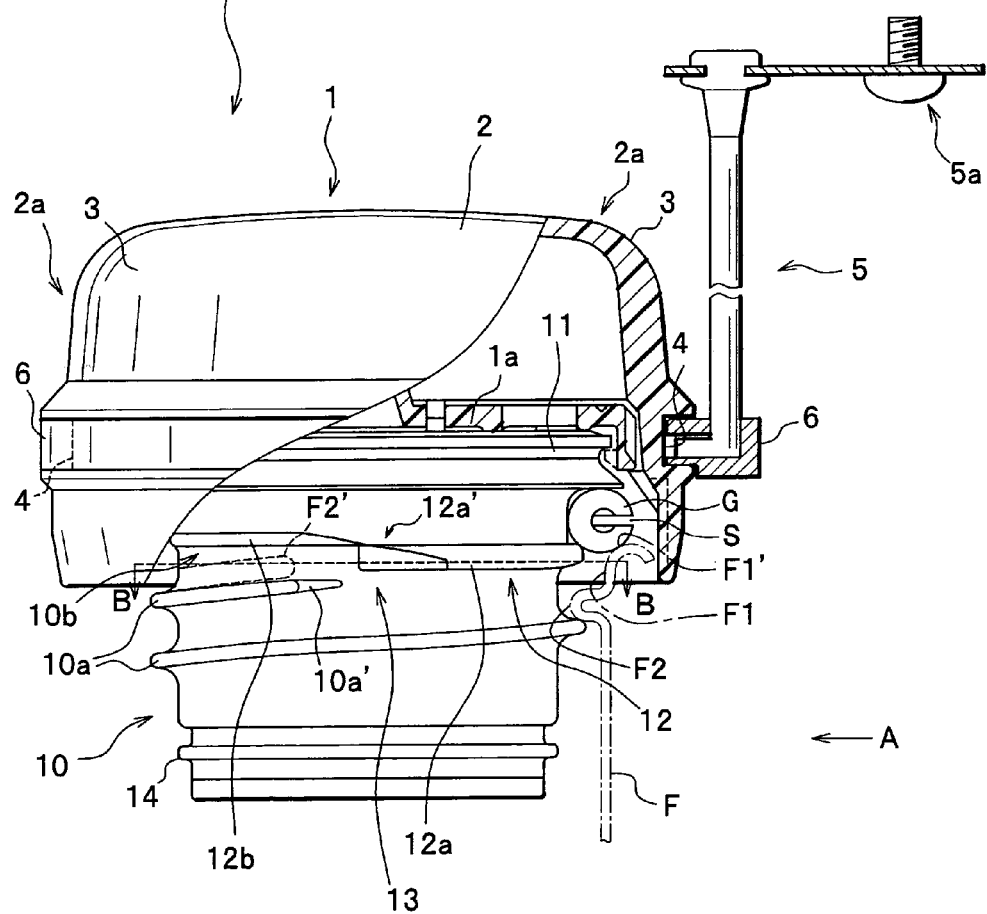
FIG. 1 shows a front view of the fuel cap according to an embodiment of the present invention, which is partially cut away.

Embodiments of the present invention will be described below in detail with reference to the accompanying drawings. In the following description referring to the drawings, the terms "upper", "lower", "bottom" and the like are used for the sake of convenience, though the orientation of the fuel cap may not be the same as in the drawings when it is practically used.

As shown in FIG. 1, a fuel cap C includes a cap member 1 and a screw member 10. The fuel cap C is fitted on a filler opening F1 of a filler neck F connected to a fuel tank of an automobile (not shown), with a thread 10a of the screw member 10 engaged with a filler neck thread F2 on an inner wall of the filler opening F1.

The cap member 1 is made of synthetic resin material, such as nylon, and on the upper face thereof, a handle part 2 for rotating operation of the cap member 1 is integrally formed. The handle part 2 upwardly protrudes and diametrally spans the upper face of the cap member 1, with the middle part of the handle part 2 located on the center of the upper face. On upper parts 2a, 2a of both longitudinal ends of the handle part 2, swell parts 3, 3 bulging outward are formed.

On the outer periphery of the cap member 1, a peripheral groove 4 is formed. A ring-shaped member 6 is slidably provided in the peripheral groove 4 and connected to a body of the automobile (not shown) via a connecting member 5, with an end part 5a thereof fixed to the body.

The screw member 10 is a cylindrical body having the thread (mate thread) 10a for engaging with the filler neck thread F2 of the filler neck F, as described above. An upper end part 11 is fitted into a fitting part 1a on the bottom of the cap member 1, and thus fixed to the bottom of the cap member 1. The thread 10a on the screw member 10 is provided so that the number of turns is set, for example, at 1.5. The term "number of turns" here means the number of turns of the effective part of the thread.

To the outer periphery of the upper portion of the screw member 10, a gasket G having a slit S is attached. By screwing the fuel cap C in the filler opening F1 of the filler neck F, the gasket G is compressed against a sealing surface F1' of the filler opening F1 of the filler neck F, thereby sealing the filler opening F1.

Figure 2:
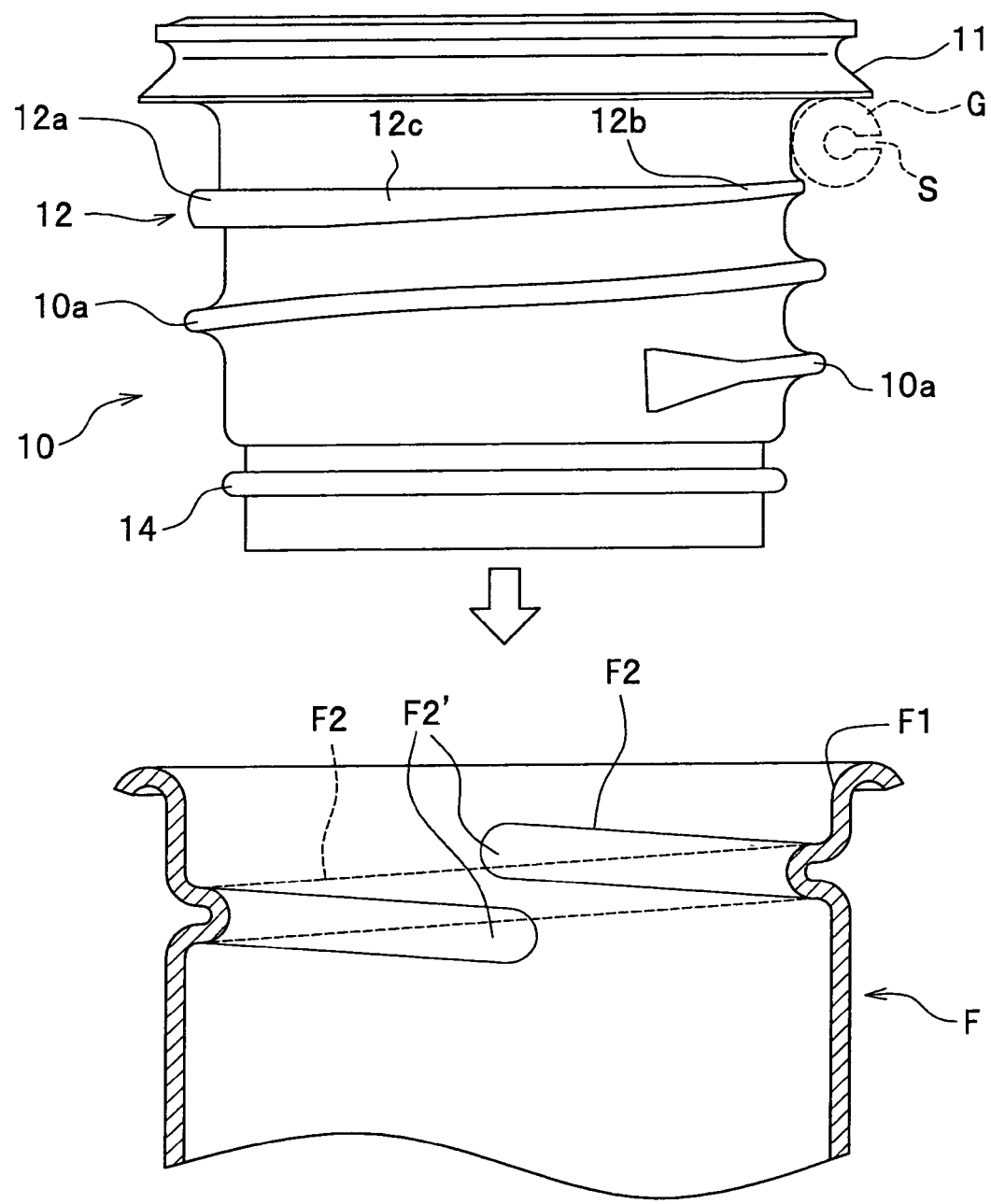
FIG. 2 is a side view of the screw member from an arrow A in FIG. 1 (a cutaway of a part of the filler opening of the filler neck is also shown).

Further on the outer periphery 10b of the upper portion of the screw member 10, a rib 12 is integrally formed with the screw member 10 for preventing the gasket G from being detached. The rib 12 includes a thick part 12a where the ridge is made thicker in height and width than other parts of the rib, and a thin part 12b where the ridge is made thinner in height and width than other parts of the rib. As shown in FIG. 2, the rib 12 also includes a tapered part 12c which tapers from the thick part 12a to the thin part 12b. The helix angle of the lower (in the drawing) edge of the tapered part 12c corresponds to the helix angle of the thread 10a located under the tapered part 12c. The thin part 12b of the rib 12 is formed in accordance with the helical slope of the lower (in the drawing) edge of the tapered part 12c, and thus is located higher than the end part 12a' of the thick part 12a, as shown in FIG. 1.

According to the present embodiment, both ends of the rib, that is, an end of the thick part 12a and an end of the thin part 12b, are together located obliquely above the terminal part 10a' of the thread 10a, and in addition to this, a gap is formed between the rib 12 and the terminal part 10a' of the thread 10a.

Figure 3:
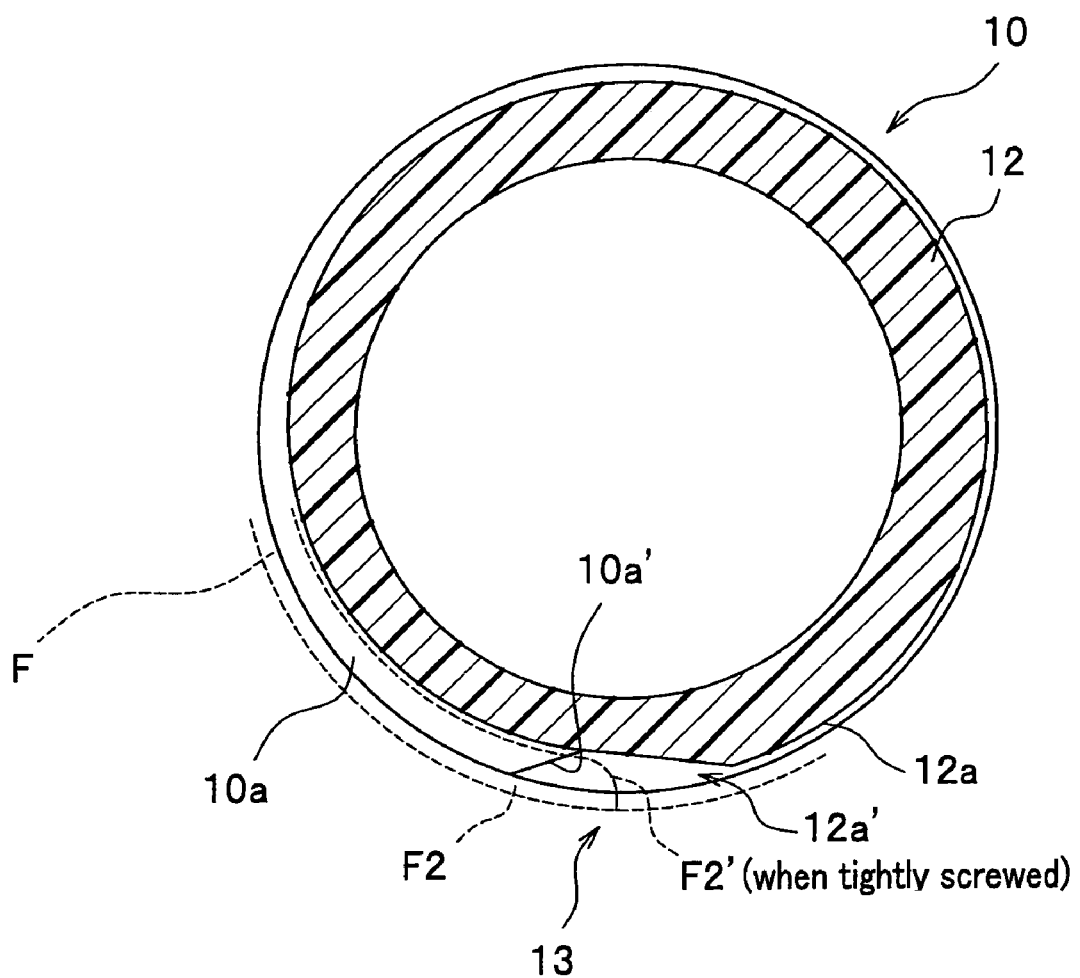
FIG. 3 shows a sectional view taken along line B-B in FIG. 1, in which figure some parts are omitted.

Moreover, at the end part 12a' of the thick part 12a of the rib 12, a cutout (a portion that has an appearance from which a piece is cut out) is formed so that a slope of the cutout is made in the circumferential direction of the screw member 10 (see FIG. 3). The combination of the above-mentioned structure and this cutout on the end part 12a' provides the space 13 for allowing the end part F2' of the filler neck thread F2 to further proceed when the fuel cap C is screwed in.

Figure 5:
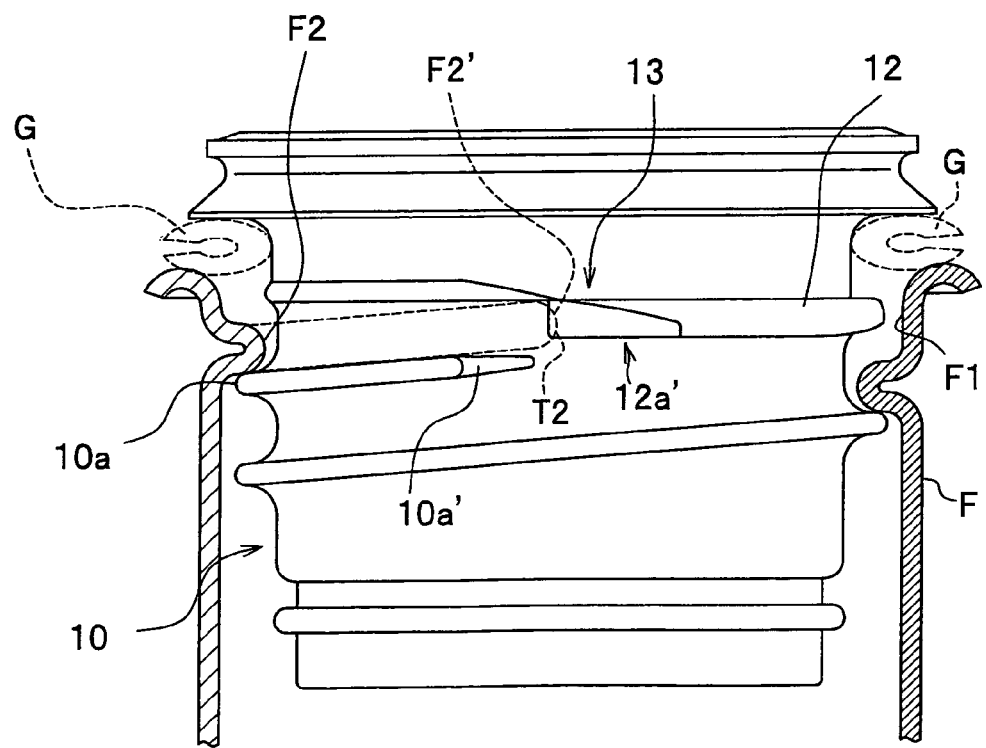
FIG. 5 shows a schematic view of the fuel cap of the present invention screwed in, with the gasket suffered from deformative weakening.
Figure 6A:
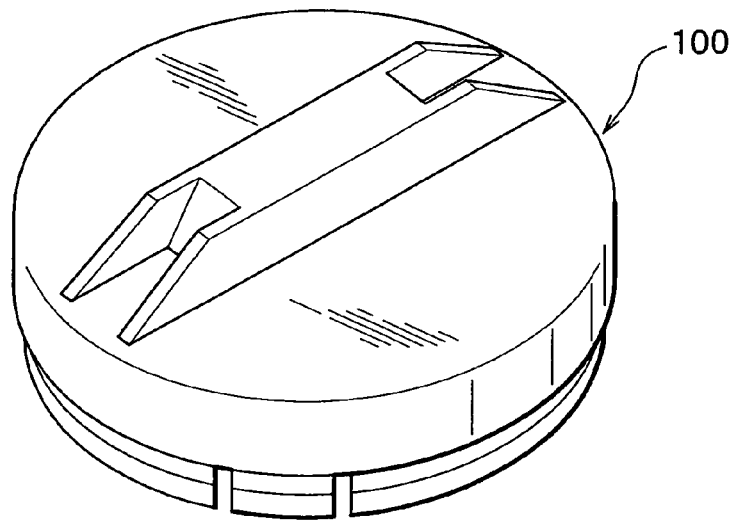
FIG. 6A and FIG. 6B show explanatory drawings of prior art.
Figure 6B:
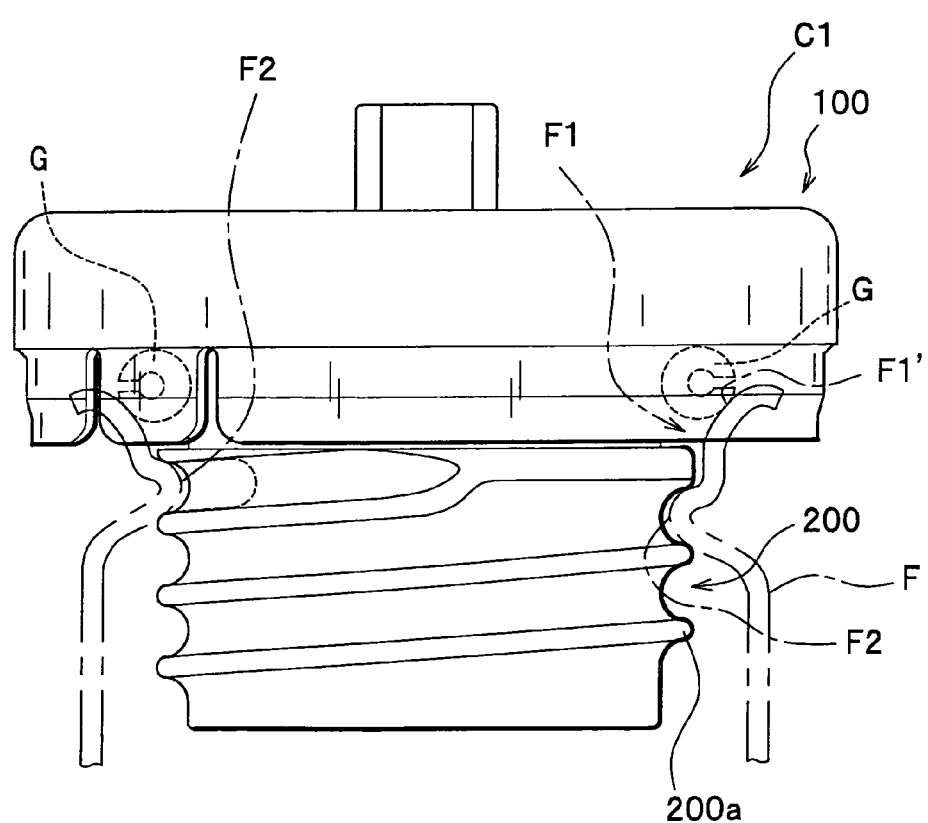
Figure 7:
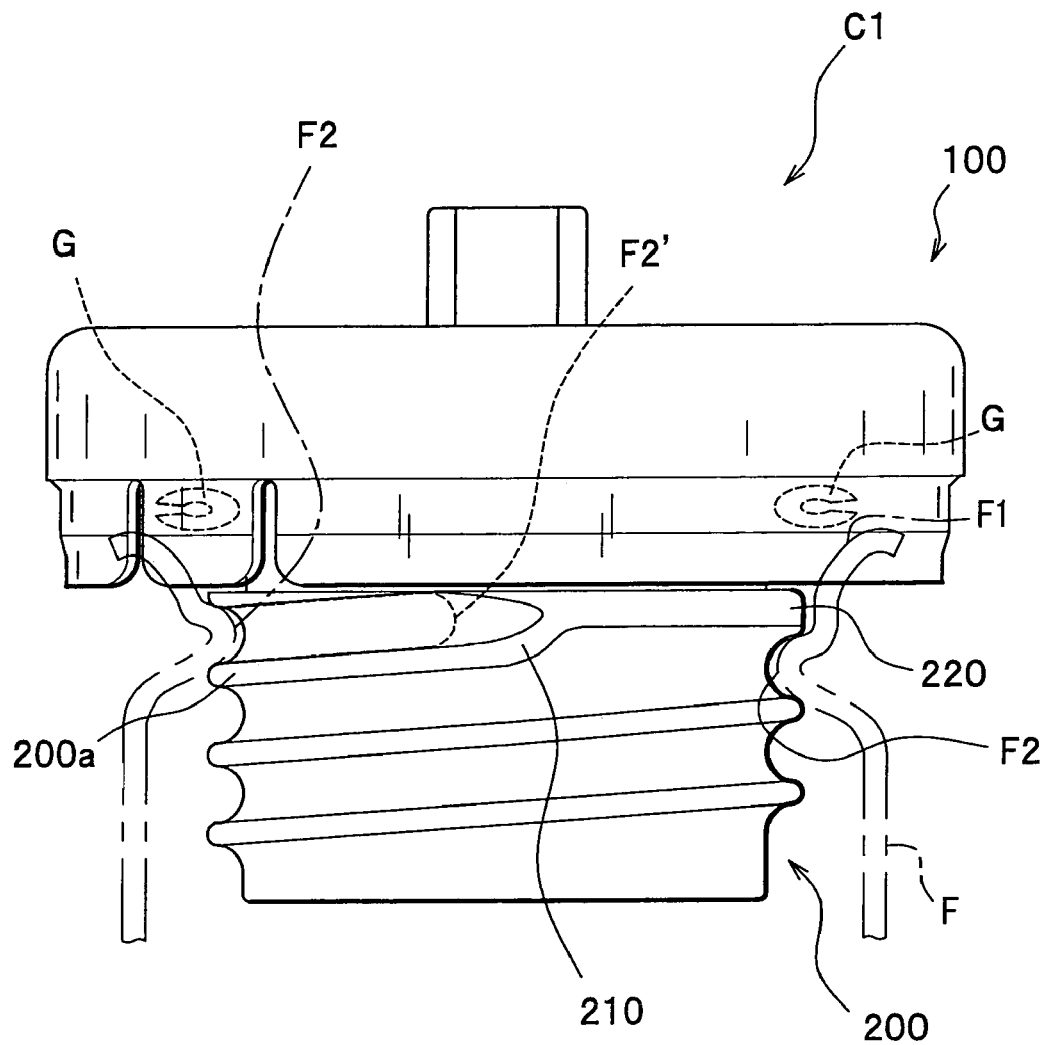
FIG. 7 shows an explanatory drawing of the prior art.

As shown in FIGS. 1 and 5, the purpose of this space 13 is to allow the filler neck thread F2 to further proceed without causing interference between the filler neck thread F2 and the rib 12 (mainly the end part 12a') when the fuel cap C is fitted on the filler opening F1 of the filler neck F. Because of the presence of the space 13, the screw member 10 can be further turned in the direction of tightly screwing. In other words, the fuel cap C of the present embodiment has a cutout on the rib 12 and the rib 12 which is not connected to the terminal part 10a' of the thread 10a, unlike the conventional fuel cap C1 (see FIGS. 6B and 7), and therefore the fuel cap C can be tightly screwed in until the filler neck thread F2 proceeds into the space 13, which is impossible with the conventional fuel caps.

In addition, as shown in FIG. 2, the radial protrusion of the thin part 12b of the rib 12 from the cylindrical part of the screw member 10 is lower than those of other parts of the rib 12, such as the thick part 12a and the tapered part 12c (hereinbelow, the height of such protrusion may be referred to as "protruding height"). The terms "low" or "lower" with respect to the protrusion of the rib in this specification describes a height of the subject part that protrudes less than the other parts. In the present invention, however, low protrusion is made so as to maintain the original function of preventing the gasket from being detached. The part of the rib 12 with low protrusion can also be utilized as a part of the space 13, and even when the end part F2' rides over the thin part 12b during screwing of the fuel cap C, the interference is kept minimum. In the present embodiment, the protruding height of the thin part 12b is set at approximately 1/10 of that of the thick part 12a, but the value may be appropriately selected from between 1/5 and 1/12, for example. It should be noted that, even though the protruding height of the thin part 12b is set smaller than those of the remaining parts, the thin part 12b circumferentially occupies approximately 1/4 of the entire circumference of the rib 12 and thus the original function of the rib, which is to prevent the gasket G from being detached, is maintained. To maintain this function, it is sufficient that the thin part 12b occupies from 1/5 to 1/3 of the entire circumference of the rib 12, and the value of 1/4 is preferred.

Between the cap member 1 and the screw member 10, a ratchet mechanism (not shown) is provided. Due to the action of the ratchet mechanism, the cap member 1 is allowed to turn one-way. When a torque reached a certain value, that is, when the above-mentioned gasket G is brought into sealing contact with the filler opening F1, the cap turns free and the excessive screwing of the fuel cap C in the filler opening F1 is avoided.

As shown in FIG. 2, the number of turns of the filler neck thread F2 in this embodiment is set at slightly above one, with the end parts F2', F2' overlapping each other in the axial direction of the filler neck F.

As shown in FIG. 1, the lower portion of the screw member 10 has a hitch part 14 for hitching the cap to a filler opening cover of the body of the automobile (not shown).

The mechanism of the fuel cap C when it is fitted on the filler opening F1 under normal condition will be explained below, where there is no deformative weakening of the gasket G attached to the fuel cap C.

Figure 4:
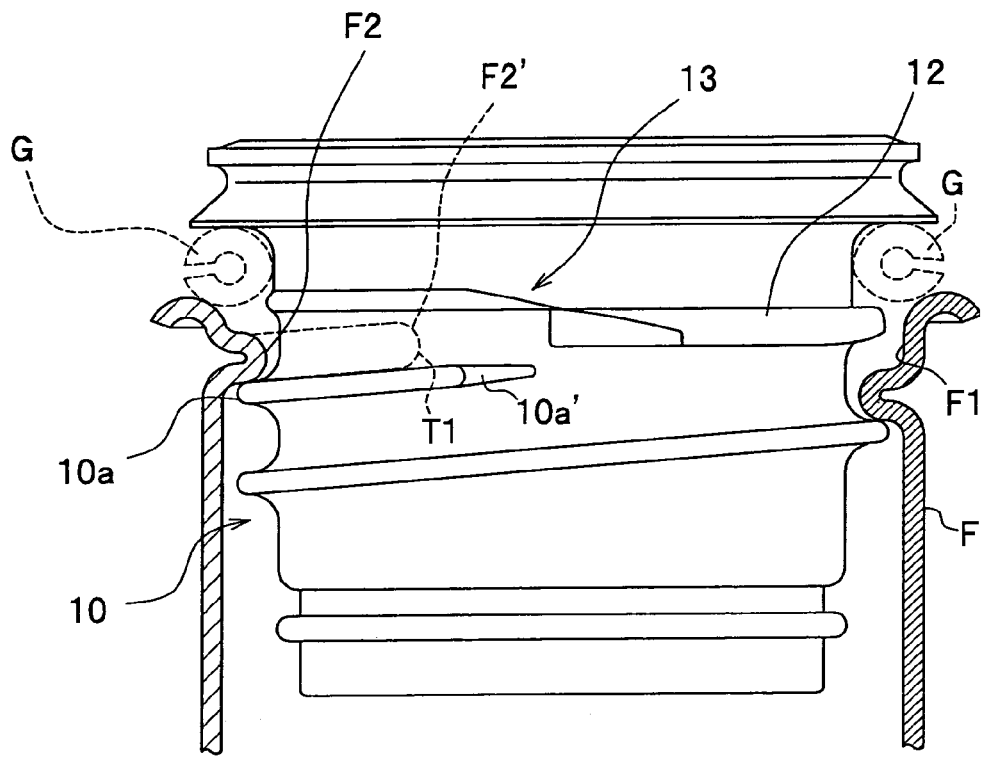
FIG. 4 shows a view of the fuel cap of the present invention screwed in under normal condition, with the gasket suffered no deformative weakening.

As shown in FIG. 1, when the screw member 10 of the fuel cap C is aligned with the filler opening F1 of the filler neck F and the fuel cap C is screwed in, the gasket G is compressed to the sealing surface F1' of the filler opening F1. The sealing of the filler opening F1 is attained with the gasket G being sagged to some extent, as shown in FIG. 4. Thereby, the fuel cap C is fitted on the filler opening F1 while preventing the evaporation of the fuel from the filler opening F1. It should be noted that, in the case of the normal gasket G with no deformative weakening, the end part F2' of the filler neck thread F2 is located at the position T1 in FIG. 4, without reaching the terminal part 10a' of the thread 10a, even when the fuel cap C is fully screwed in the filler opening F1.

The mechanism of the fuel cap C when it is fitted on the filler opening F1 will be explained below, in the case where the gasket G on the fuel cap C suffered, for example, deformative weakening with time or aging.

When the gasket G suffered deformative weakening, the fuel cap C should be further screwed tightly in the filler opening F1 in order to secure sealability of the fuel cap C. Therefore, as shown in FIG. 5, when the fuel cap C is screwed in until the gasket G is fully compressed against the sealing surface F1' of the filler opening F1, the end part F2' of the filler neck thread F2 may slide past the terminal part 10a' of the thread 10a, to reach the position (or the vicinity thereof) indicated T2 in the figure. Since the space 13 is provided at this portion, the interference or contact is prevented between the end part F2' of the filler neck thread F2 and the end part 12a' of the rib 12, as also shown in FIG. 3. In other words, the end part F2' of the filler neck thread F2 is in the space 13.

For this reason, the fuel cap C is tightly screwed well in the filler opening F1.

According to the present embodiment of the fuel cap explained above, the filler neck thread F2 is allowed to proceed into the space 13 provided in the portion where the terminal part 10a' of the thread 10a and the rib 12 (especially the end part 12a' of the thick part 12a) of the screw member 10 are located together. With that proceeding amount of the filler neck thread F2, the fuel cap C can be further screwed in the filler opening F1 of the filler neck F. Therefore, even after the gasket G suffered, for example, deformative weakening with time or aging, the fuel cap C can be tightly screwed into with no trouble, and therefore the excellent and tight screwing in the filler opening F1 of the filler neck F can be maintained. Accordingly, evaporation of the fuel from the filler opening F1 of the filler neck F can be advantageously avoided.

As described above, the rib 12 does not have to occupy full circumference of the screw member 10, and at least a part of the rib 12 may have a recess in the form of cutout, or at least a part of the rib 12 may protrude lower than the remaining part of the rib 12. For example, a cutout formed on at least a part of the rib 12 can be utilized as the space 13 for allowing the filler neck thread F2 to proceed further. Since only part(s) of the rib 12 has cutout, the original function of the rib 12, which is to prevent the gasket G from being detached, is still maintained. Likewise, lower protrusion formed on at least a part of the rib 12 than the remaining part of the rib 12 can also be utilized as the space 13. Even when the end part F2' rides over the thin part 12b during screwing of the fuel cap C, the interference is kept minimum because of the lower protrusion of the thin part 12b than other parts, and thus advantage is obtained in that the tight screwing of the fuel cap C is still conducted smoothly. Moreover, because at least a part of the rib 12 is formed lower, the attachment of the gasket on the screw member is facilitated.

The present invention is not limited to the particular embodiments discussed above and may be carried out in various modified forms. For example, the shape of the rib 12 or the gasket G should not be limited to those mentioned above, and any modification may be adapted. The space 13 may be provided solely by a cutout as a recess. The thin part 12b protruding lower may be circumferentially longer than that in the embodiment of FIG. 1, while the end of the thick part 12a and the end of the thin part 12b together may be located farther right from the terminal part 10a' of the thread 10a in FIG. 1. In this case, the space 13 may be provided solely by a lower protrusion as a recess. The lower edge of the thick part 12a and/or the thin part 12b may have the helix angle which is the same as or similar to that of the tapered part 12c. The slope surface of the cutout on the end part 12a' of the thick part 12a may be flat or curved. The terminal part 10a' of the thread 10a may be formed so that it is connected with the rib 12, if the terminal part 10a' is in the position that does not interfere with the filler neck thread F2 when the fuel cap C is screwed in. Various values can be selected for the number of turns or the helix angle with respect to the thread 10a and the filler neck thread F2.

What is claimed is:

1. A fuel cap for a filler opening of a filler neck of a fuel tank comprising:
    a cap member;
    a screw member comprising
        a cylindrical body,
        a thread provided on the outer periphery of the cylindrical body for engaging with a thread provided on the filler neck and
        a rib provided on the outer periphery of the cylindrical body which is closer to the cap member than the thread; and
    a gasket to be compressed against the filler opening for sealing the filler opening, in which the gasket is attached to the screw member, and said rib prevents the gasket from being detached,
    wherein the rib includes a tapered portion radially protruding from the screw member in which a slope of the tapered portion is made in circumferential and radial directions of the screw member, the tapered portion being located to begin tapering adjacent an end part of the thread on the screw member so as to provide a space that allows the filler neck thread to pass through, thereby allowing the screw member to be screwed tightly without causing interference between the rib and the filler neck thread.

2. The fuel cap according to claim 1, wherein the tapered portion is in the form of a cutout of the rib.

3. The fuel cap according to claim 1, wherein the rib comprises a thin part that protrudes less in axial and radial directions of the screw member than a remaining part of the rib to provide the space that allows the filler neck thread to pass through.

4. The fuel cap according to claim 2, wherein the rib comprises:
    a thin part that protrudes less in axial and radial directions of the screw member than a remaining part of the rib to provide the space that allows the filler neck thread to pass through.

5. The fuel cap according to claim 3, wherein the height of the thin part measured radially from the cylindrical body is from $1/12$ to $1/5$ of the height of the highest portion of the rib.

6. The fuel cap according to claim 2, wherein the height of the thin part measured radially from the cylindrical body is from $1/12$ to $1/5$ of the height of the highest portion of the rib.

7. The fuel cap according to claim 3, wherein the thin part circumferentially occupies from $1/5$ to $1/3$ of the entire circumference of the rib.

8. The fuel cap according to claim 2, wherein the thin part circumferentially occupies from $1/5$ to $1/3$ of the entire circumference of the rib.

* * * * *

UNITED STATES PATENT AND TRADEMARK OFFICE
CERTIFICATE OF CORRECTION

PATENT NO. : 7,575,124 B2
APPLICATION NO. : 11/166494
DATED : August 18, 2009
INVENTOR(S) : Nakai et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 931 days.

Signed and Sealed this

Seventh Day of September, 2010

David J. Kappos
*Director of the United States Patent and Trademark Office*